United States Patent [19]

Henriksson

[11] Patent Number: 5,427,147
[45] Date of Patent: Jun. 27, 1995

[54] VALVE FOR REGULATING AND/OR SHUTTING OFF THE FLOW OF LIQUID IN A CONDUIT

[75] Inventor: Mats E. Henriksson, Älvkarleby, Sweden

[73] Assignee: Vattenfall Utveckling AB, Sweden

[21] Appl. No.: 193,067

[22] PCT Filed: Aug. 20, 1992

[86] PCT No.: PCT/SE92/00561
§ 371 Date: May 16, 1994
§ 102(e) Date: May 16, 1994

[87] PCT Pub. No.: WO93/06400
PCT Pub. Date: Apr. 1, 1993

[30] Foreign Application Priority Data

Sep. 23, 1991 [SE] Sweden .................. 9102745

[51] Int. Cl.⁶ ............................. F16K 3/22
[52] U.S. Cl. .................. 137/625.3; 137/625.37; 251/127
[58] Field of Search .......... 137/625.3, 625.37; 251/127

[56] References Cited

U.S. PATENT DOCUMENTS 2,925,991  2/1960  Hempel .................. 251/127 X
4,041,982  8/1977  Lindner .................. 137/625.3
4,279,274  7/1981  Seger .

FOREIGN PATENT DOCUMENTS 2431322  8/1976  Germany .

Primary Examiner—John C. Fox

[57] ABSTRACT

A liquid-regulating valve comprises a cylinder tube (6) having holes (7) through which liquid can pass in radial jets. Further, the valve comprises a piston (9) and a distributing means (15) which is fixedly mounted in the cylinder-tube (6) and consists of several radial walls (16) upon which impinge the liquid jets entering through the cylinder tube holes (7) to be disintegrated and divided into part flows. At one end, the distributing means (15) has a cover plate (20) which, at the periphery, merges into an annular flange (21) projecting axially from the plate and serving to divert and guide the liquid part flows that, after impinging upon the radial walls of the distributing means, are directed towards the cover plate (20) and follow the plate along a substantially axial path of motion.

2 Claims, 3 Drawing Sheets

VALVE FOR REGULATING AND/OR SHUTTING OFF THE FLOW OF LIQUID IN A CONDUIT

FIELD OF THE INVENTION

This invention relates to a valve for regulating and-/or shutting off the liquid flow in a conduit, comprising a stationary cylinder tube incorporated in a valve housing for the conduit and having a series of through holes through which liquid can pass in radial jets from an inlet member of the valve housing surrounding the cylinder tube to an outlet member communicating with the interior of the cylinder tube; a reciprocating piston mounted in the cylinder tube and comprising a body member and a cylinderical member projecting axially therefrom, said body member and said cylinderical member together defining an open cavity within the piston; and a distributing means fixedly mounted in the cylinder tube and receivable in said cavity, said distributing means consisting of a plurality of walls (e.g. four) which extend radially from a central connecting point and divide the interior of the cylinder tube into a number of sector-shaped compartments into which the liquid is sprayed through the cylinder-tube holes in jets impinging upon the walls of the distributing means to be disintegrated and divided into part flows directed towards the body member of the piston as well as the outlet member of the valve housing.

In actual practice, the valve piston is connected by means of a spindle to a compressed-air-operated setting mechanism serving to move the piston not only to its closing and opening end positions, but also to optional intermediate positions in which the piston but partially covers the cylinder-tube holes.

BACKGROUND OF THE INVENTION

Valves of this type are especially well suited for regulating and shutting off the liquid flow in conduits at extremely high liquid pressures. Thus, such valves are advantageously used in feed water conduits of nuclear reactors, where the pressure of the water often amounts to 25 bar or more. An important advantage of the valve arrangement described is that the reciprocating piston can be rapidly and accurately moved to its closing position also at extremely high liquid pressures. This is due to the fact that the piston moves perpendicularly to the liquid jets entering radially through the cylinder-tube holes and successively closes the holes. Thus, the setting mechanism will not be exposed to the full force of the liquid rushing through the conduit at high pressures.

An inconvenience of such prior-art valves is, however, that the valve housing as well as the associated conduits tend to be set in vibration. Under unfavourable circumstances, the vibrations may attain an amplitude of 1 mm or more, and thus be particularly difficult to overcome. The vibrations are caused by a number of concurrent factors, the most important being that the part flows formed when the water jets coming through the cylinder-tube holes and impinging upon the walls of the distributing means, are dispersed not only directly towards the outlet member of the valve housing, but also towards the body of the piston. Thus, the piston will be acted upon by comparatively important forces from the part flows with which it comes into contact, and the piston and the associated spindle may then be set in self-oscillation. If the oscillations in the piston are intensified and propagated to the conduit system, it may become necessary to close the valve and put it out of use temporarily.

In prior-art valves, efforts have been made to avoid that the water part flows directed towards the body member of the piston come into direct contact with this member. More precisely, a simple plate has been provided at the distributing-means end facing the body member of the piston. Thus, the part flows impinge upon this plate before-reaching the body member of the piston. However, this simple plate cannot prevent the disintegrated water from impinging upon the cylindrical member of the piston, thus subjecting the latter to comparatively important forces. Neither does the plate prevent water from rushing in between the distributing means and the body member of the piston.

OBJECT OF THE INVENTION

The object of the present invention is to obviate the above inconvenience in prior-art valves of the type described, providing a valve which cannot be set in vibration. According to the invention, this object is achieved by a valve having the characteristics recited in appended claim 1.

DETAILED DESCRIPTION OF A PREFERRED EMBODIMENT OF THE INVENTION

Figure 1:
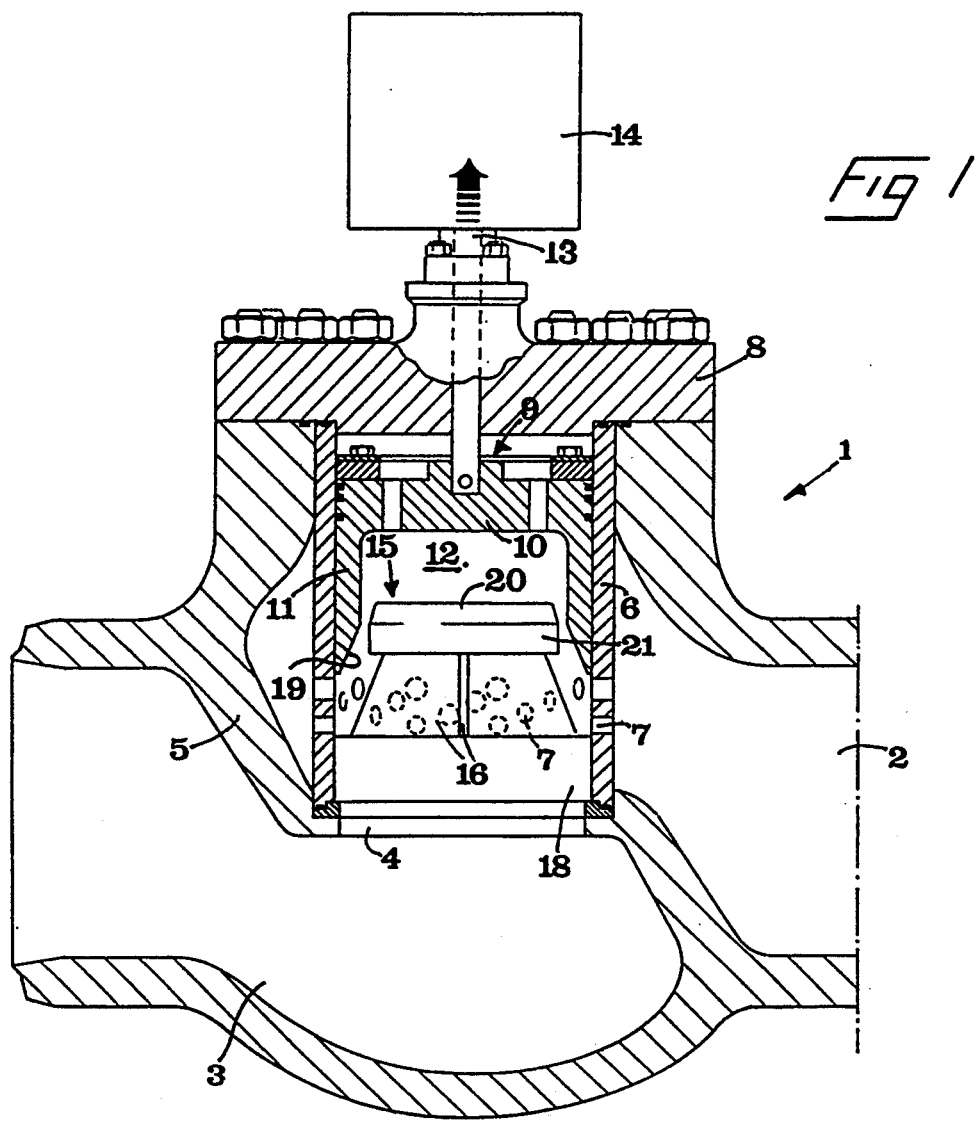
FIG. 1 is an axial, partly simplified section of a valve according to the invention, the valve piston being shown in opening position.
Figure 5:
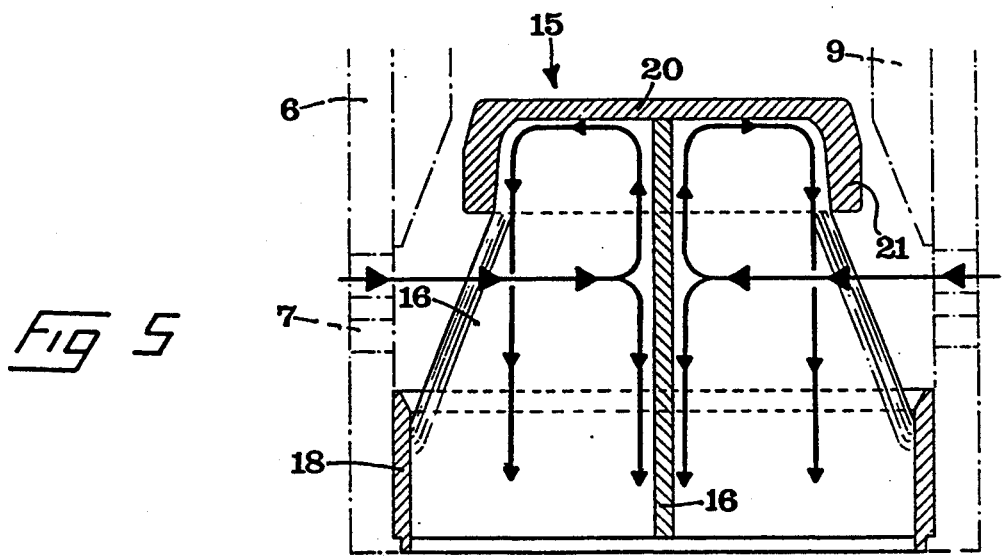
FIG. 5 is a longitudinal section of the distributing means.

In the drawings, a valve housing generally designated 1 comprises an inlet member 2 adapted for connection to an incoming conduit (not shown), and an outlet member 3 adapted for connection to an outgoing conduit. A partition 5 having an opening 4 separates the inlet member 2 from the outlet member 3. A cylinder tube 6 is incorporated in the inlet member 2 and has, at its lower part, a plurality of small through holes 7 which are distributed along the periphery of the tube according to a specific pattern (the holes may be of different size and shape, but are usually of circular cross-section). The cylinder tube 6 is maintained in place in the valve housing by an end wall 8 secured to the valve housing by a screw joint. It should be observed that the inlet member 2 has such a shape that the incoming liquid can flow all around the lower part of the cylinder tube 6. In this manner, the incoming liquid will pass through all the open holes 7 in radial jets directed towards the centre axis of the cylinder tube.

An axially reciprocating piston 9 is arranged in the cylinder tube 6 and comprises a body member 10 and a cylindrical member 11 projecting axially downwards therefrom. Together, these two members define an open cavity 12 in the piston. By a spidle or shaft 13, the piston is connected to a setting mechanism (schematically illustrated at 14 which is driven by compressed air and serves to move the piston axially inside the cylinder tube.

Figure 2:
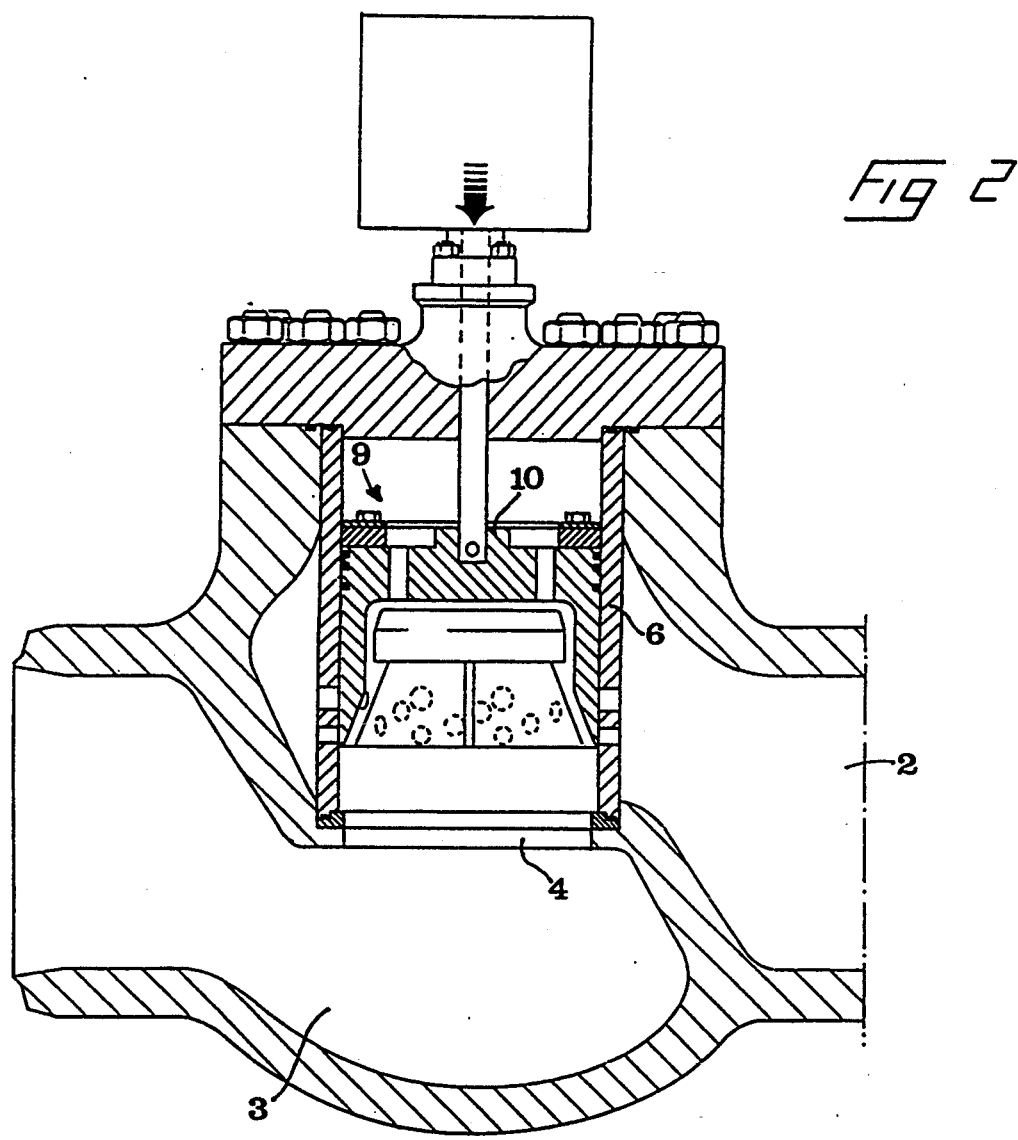
FIG. 2 is a similar section, the valve piston being shown in closing position.
Figure 3:
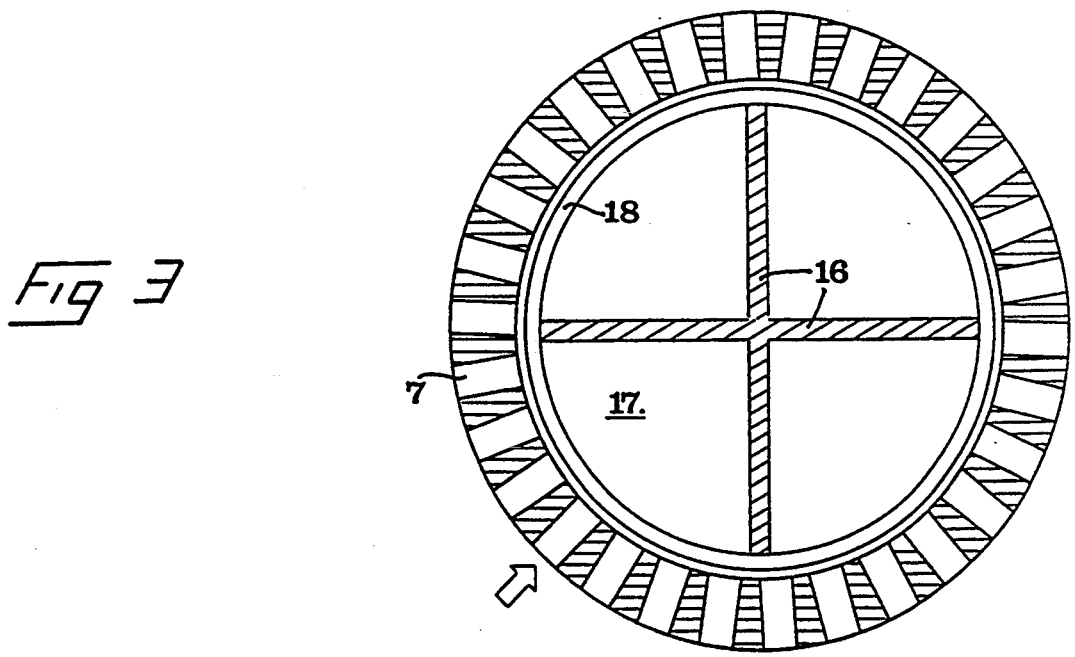
FIG. 3 is an enlarged cross-section of a cylinder tube forming part of the valve and equipped with a distributing means.
Figure 4:
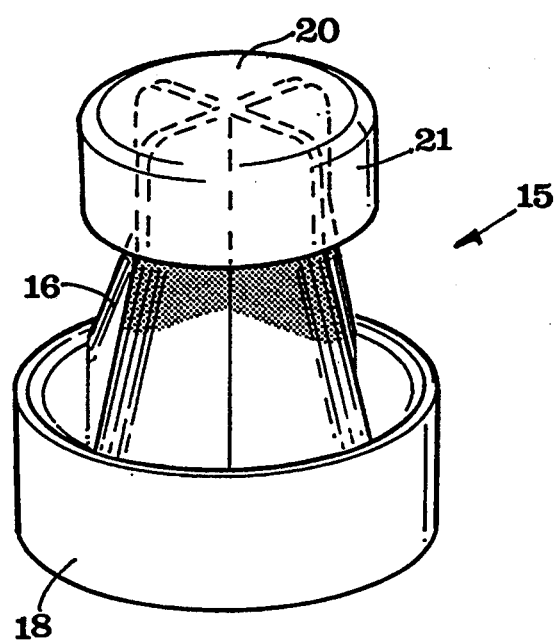
FIG. 4 is a perspective view of the distributing means.

A distributing means, generally designated 15, is fixedly mounted in the lower part of the cylinder tube 6 and consists of a plurality (in this case four) walls 16 extending radially from a central connecting point and dividing the interior of the cylinder tube into a number of sector-shaped compartments 17. The radial walls 16 are kept together by a lower ring 18 which is immobilised between an internal shoulder on the cylinder tube and a seating adjacent to the opening 4 in the partition 5. The outer edges of the radial walls 16 are bevelled so as to correspond to the conicity of a bevel 19 on the inside of the cylindrical member 11 of the piston. When the piston is in the closing position shown in FIG. 2, the distributing means 15 is housed in the piston cavity 12 defined by the cylindrical member 11 and takes up most of this cavity.

Thus far, the valve described is in all essentials previously known.

According to the invention, the distributing means 15 is, at the end facing the body member 10 of the piston, equipped with a circular cover plate 20 which, at the periphery, merges into an annular flange 21 which projects some distance axially downwards from the plate towards the outlet member 3 of the valve housing. Advantageously, the transitional area 22 between the plate and the annular flange 21 is gently rounded, at least on the inside. The diameter of the plate 20 is so large that the plate entirely covers the upper end edges of the radial walls 16, the outer diameter of the annular flange 21 suitably being but slightly smaller than the inner diameter of the cylindrical member 11 of the piston. In practice, the annular flange 21 may have an outer diameter of 210 mm, while the smallest inner diameter of the cylindrical member 11 is 215–220 mm. If so, the plate 20 may have a thickness of about 10 mm, and the height of the annular flange 21 may then amount to 40–50 mm, conveniently about 45 mm.

The described valve operates as follows. When the piston 9 is set in a completely or partly opening position in which all or some of the holes 7 are uncovered below the lower edge of the cylinderical member 11, the liquid entering the inlet member 2 will pass through the holes 7 in radial jets which, as a function of the current liquid pressure, impinge upon the radial walls 16 of the distributing means 15 with great force. In doing so, the jets disintegrate to form smaller part flows directed both downwards towards the outlet member 3 and upwards towards the cover plate 20. The part flows directed towards the cover plate 20 will, when impinging upon the plate, first be directed radially outwards and subsequently be diverted by the annular flange 21 and guided in substantially axial, downwardly-directed paths of motion inwardly of the cylindrical member 11. Naturally, these axial liquid part flows will in turn be hit by the incoming radial liquid jets from the holes 7 and thus be further divided into diffuse or indifferent flows, which are still further divided. However, the latter will not possess any great inherent force capable, when contacting the piston, of setting it in vibration. Thus, the annular flange 21 of the invention ensures that the comparatively strong part flows which are directed upwards towards the cover plate 20 when the incoming radial jets come into contact with the radial walls 16, will be diverted in axial, downwardly-directed paths of motion at a distance inwardly of the cylindrical piston member, which will thus not be exposed to any considerable forces by the liquid flowing through the valve.

I claim:

1. A valve for regulating and/or shutting off the liquid flow in a conduit, comprising a stationary cylinder tube (6) incorporated in a valve housing (1) for the conduit and having a series of through holes (7) through which liquid can pass in radial jets from an inlet member (2) surrounding the cylinder tube to an outlet member (3) communicating with the interior of the cylinder tube; a reciprocating piston (9) mounted in the cylinder tube (6) and comprising a body member (10) and a cylindrical member (11) projecting axially therefrom, said body member and said cylindrical member together defining an open cavity (12) within the piston; and a distributing means (15) fixedly mounted in the cylinder tube and receivable in said cavity (12), said distributing means consisting of a plurality of walls (16) (e.g. four) which extend radially from a central connecting point and divide the interior of the cylinder tube into a number of sector-shaped compartments (17) into which the liquid is sprayed through the cylinder-tube holes in jets impinging upon the walls of the distributing means to be disintegrated and divided into part flows directed towards the body member (10) of the piston as well as the discharge member (3) of the valve housing, characterised in that the distributing means (15) has, at the end facing the body member (10) of the piston, a cover plate (20) which, at the periphery, merges into an annular flange (21) projecting some distance axially from the plate towards the outlet member of the valve housing and serving to divert and guide the liquid part flows that, after impinging upon the radial walls of said distributing means, are directed towards the cover plate (20) and follow said plate along a substantially axial path of motion inwardly of the cylinderical member (11) of the piston.

2. A valve as claimed in claim 1, characterised in that the transitional area between the cover plate (20) and the annular flange (21) is gently rounded, at least on the inside.

* * * * *